(12) United States Patent
Monnes et al.

(10) Patent No.: US 8,422,447 B2
(45) Date of Patent: Apr. 16, 2013

(54) CELLULAR NETWORK

(75) Inventors: Peter Monnes, Chelmsford, MA (US); Thomas Andrew Hengeveld, Hollis, NH (US); Micael Martell, Kungsbacka (SE)

(73) Assignee: Harris Corporation, Melbourne, FL (US)

( * ) Notice: Subject to any disclaimer, the term of this patent is extended or adjusted under 35 U.S.C. 154(b) by 487 days.

(21) Appl. No.: 12/870,176

(22) Filed: Aug. 27, 2010

(65) Prior Publication Data
US 2012/0051330 A1    Mar. 1, 2012

(51) Int. Cl.
*H04W 4/00* (2009.01)
(52) U.S. Cl.
USPC .......................................... 370/329; 455/450
(58) Field of Classification Search .................. 370/329; 455/450
See application file for complete search history.

(56) References Cited

U.S. PATENT DOCUMENTS

| 7,155,248 | B2 | 12/2006 | Idnani |
| 2006/0014556 | A1 | 1/2006 | Park et al. |
| 2007/0153752 | A1 | 7/2007 | Donnellan |

*Primary Examiner* — Kevin C Harper
*Assistant Examiner* — Henry Baron
(74) *Attorney, Agent, or Firm* — Fox Rothschild, LLP; Robert J. Sacco (57) ABSTRACT

Systems (200) and methods for providing voice communications over a cellular network (204, 212). A call setup message is communicated from a first communication device (FCD) to a second communication device (SCD) on a first communications channel (FCC) in a cellular network (CN) at a first data transfer rate (FDTR). In response to the call setup message, a stimulator packet is communicated to the CN on FCC at FDTR. The stimulator packet includes data of an amount that equals or exceeds a threshold value. In response to the stimulator packet, FCD (202, 214) and CN transition from a first channel mode to a second different channel mode. In the second channel mode, data is transmitted on a second communications channel (SCC) in CN at a second data transfer rate (SDTR) different than FDTR.

23 Claims, 8 Drawing Sheets

CELLULAR NETWORK

BACKGROUND OF THE INVENTION

1. Statement of the Technical Field

The inventive arrangements relate to communication systems, and more particularly to systems and methods for providing call/connection establishment in cellular networks.

2. Description of the Related Art

There are various cellular networks known in the art. Such cellular networks include a Wideband Code Division Multiple Access (WCDMA) based network, a Long Term Evolution (LTE) based network, an LTE Advanced based network and various other networks that offer a state of high readiness with a shared/common channel. Each of these cellular networks comprises a plurality of communication devices and network equipment configured to facilitate communications between the communication devices. Each cellular network often provides a PTT service to a PTT service subscriber using a communication device. The PTT service is an instant service by which the PTT service subscriber is able to immediately talk to one or more other PTT service subscribers by pushing a PTT button of the communication device.

A WCDMA based cellular network typically supports various modes of communication, such as a shared channel mode and a dedicated channel mode. In the shared channel mode, data is communicated between a calling communication device and a called communication device at a first data transfer rate (e.g., 16 Kilo-bits per second or 32 Kilo-bits per second) over a shared channel in an air interface. The phrase "shared channel", as used herein, refers to a channel that carries data associated with a plurality of communication devices. In the dedicated channel mode, data is communicated between the calling communication device and the called communication device at a second data transfer rate over a dedicated channel. The phrase "dedicated channel", as used herein, refers to a channel that carries data associated with only one (1) communication device. The second data rate (e.g., 2-40 Mega-bits per second) is greater than the first data transfer rate.

During operation, the communication devices and network equipment dynamically switch between their shared channel modes and their dedicated channel modes based on one or more existing or predicted conditions of a connection established therebetween. These conditions can include, but are not limited to, the amount of data to be communicated to and from a communication device. For example, if the amount of data to be communicated from a calling communication device exceeds a particular threshold value or data rate, then the calling communication device and associated network equipment transition from their shared channel mode to their dedicated channel mode. Similarly, if the amount of data to be communicated to a called communication device exceeds a particular threshold value or data rate, then the called communication device and associated network equipment transitions from their shared channel mode to their dedicated channel mode.

Notably, a calling communication device will not transmit voice packets while it is transitioning from its shared channel mode to its dedicated channel mode. Likewise, a called communication device will not receive voice packets when it is transitioning from its shared channel mode to its dedicated channel mode. In effect, an interruption in speech communications occurs. This interruption in speech communications is undesirable from the point of view of speech quality.

In view of the forgoing, there is a need for an improved method for reducing the delay in setting up calls. In this regard, there is a need for an improved method for dynamically switching between the shared channel modes and the dedicated channel modes. This improved method should facilitate the provision of a communication system with an upswitch or communication mode switch time that is decreased as compared to that of conventional systems (such as those described above).

SUMMARY OF THE INVENTION

Embodiments of the present invention generally concern implementing systems and methods for providing call/connection establishment in cellular networks. According to aspects of the present invention, the methods involve communicating a call setup message from a first communication device to a second communication device on a first communications channel in the cellular network at a first data transfer rate. In response to the call setup message, a stimulator packet is communicated to the first cellular network on the first communications channel at the first data transfer rate. The stimulator packet includes data of an amount that equals or exceeds a threshold value. In response to the stimulator packet, the cellular network transitions from a first channel mode to a second channel mode. Also, the first or second communication device transitions from the first channel mode to the second channel mode. The first channel mode is different than the second channel mode. In the second channel mode, data is transmitted on a second communications channel in the cellular network at a second data transfer rate different than the first data transfer rate. After the channel mode change, data packets can be communicated from the first communication device to the second communication device on the second communications channel at a second data transfer rate.

According to other aspects of the present invention, the methods involve filling at least one buffer of a communication device with a stimulator packet. Subsequent thereto, a request is made for switching the channel modes of the cellular network. In response to the request, the cellular network transitions from the first channel mode to the second channel mode. Similarly, the first or second communication device from the first channel mode to the second channel mode.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention generally concern implementing systems and methods for providing call/connection establishment in cellular networks. Notably, the systems and methods of the present invention are configured to overcome certain drawbacks of conventional implementing systems and methods for providing call/connection establishment in cellular networks. For example, the present invention has a reduced delay in the transmission of voice and/or data packets when establishing a call as compared to that of conventional communication systems.

In certain scenarios, the methods involve providing voice communications (e.g., PTT voice communications) over a network. Notably, the systems and methods of the present invention are configured to overcome certain drawbacks of conventional implementing systems and methods for providing voice communications over a cellular network. In this regard, it should be understood that typically several voice packets are needed to fill a buffer of a receiving communication device. The buffer fill process wastes time. Also, audio defined by some of the voice packets is output from the receiving communication device prior to a relatively large gap caused by an eventual upswitch or communication mode switch by the transmitting and receiving communication devices. In contrast to the conventional communication systems, the present invention advantageously ensures that no or a reduced amount of audio will be output from the receiving communication device prior to an upswitch or communication mode switch by the transmitting and receiving communication devices.

In this regard, it should be understood that method embodiments of the present invention generally involve communicating a call setup message from a calling communication device to a first network access point (e.g., a server) on a first communications channel (e.g., a shared channel) in a first cellular network (e.g., a WCDMA based network) at a first data transfer rate (e.g., 16 Kilo-bits per second or 32 Kilo-bits per second). In response to the call setup message, a stimulator packet is communicated from the first network access point to the first cellular network on the first communications channel at the first data transfer rate. The stimulator packet includes data of an amount that equals or exceeds a threshold value. In response to the stimulator packet, communications are exchanged between the first cellular network and the calling communication device for transitioning from a first channel mode (e.g., a shared channel mode) to a second channel mode (e.g., a dedicated channel mode). In the second channel mode, data is transmitted on a second communications channel (e.g., a dedicated channel) in the first cellular network at a second data transfer rate (e.g., 2-40 Mega-bits per second). After transitioning to the second channel mode, the stimulator packet is communicated from the first cellular network to the calling communication device on the second communications channel at the second data transfer rate. Also, data packets are communicated from the calling communication device to the first network access point on the second communications channel at the second data transfer rate.

Method embodiments of the present invention can alternatively involve communicating a call setup message from a calling communication device to the first network access point (e.g., a server) on a first communications channel (e.g., a shared channel) in the first cellular network (e.g., a WCDMA based network) at the first data transfer rate (e.g., 16 Kilo-bits per second or 32 Kilo-bits per second). In response to the call setup message, buffers of the calling communication device are filled with the stimulator packet. The stimulator packet triggers the generation of a request for an upswitch of the first cellular network. The request is then communicated from the calling communication device to the first cellular network. Upon receipt of the request, the first cellular network begins an exchange of communications with the calling communication device for transitioning from the first channel mode (e.g., a shared channel mode) to the second channel mode (e.g., a dedicated channel mode). After transitioning to the second channel mode, the stimulator packet can be communicated from the calling communication device to the first network access point on the second communications channel at the second data transfer rate. Also, data packets can be communicated from the calling communication device to the first network access point on the second communications channel at the second data transfer rate.

The above described method embodiments of the present invention can also involve forwarding the call setup message to a called communication device (e.g., a mobile phone) over a third communication channel (e.g., a shared channel) in a second cellular network (e.g., a WCDMA based network) at the first data transfer rate. In response to the call setup message, the stimulator packet is communicated from a second network access point to the second cellular network over the third communication channel at the first data rate. In response to the stimulator packet, the second cellular network begins exchanging communications with the called communication device for transitioning from the first channel mode (e.g., a shared channel mode) to the second channel mode (e.g., a dedicated channel mode). After transitioning to the second channel mode, the stimulator packet is communicated from the second cellular network to the called communication device on a fourth communications channel at the second data transfer rate. In this scenario, the calling and called communication devices advantageously transition from their first channel modes to their second channel modes at substantially the same time. In effect, the total time for channel transition is substantially reduced (e.g., reduced by approximately 50%) as compared to that of conventional communication systems.

The above described methods of the present invention can alternatively involve forwarding the call setup message to a called communication device (e.g., a mobile phone) over a third communication channel (e.g., a shared channel) in a second cellular network (e.g., a WCDMA based network) at the first data transfer rate. In response to the call setup message, buffers of the called communication device are filled with the stimulator packet. The stimulator packet triggers the generation of a request for an upswitch of the second cellular network. The request is then communicated from the called communication device to the second cellular network. Upon receipt of the request, the second cellular network begins an exchange of communications with the called communication device for transitioning from the first channel mode (e.g., a shared channel mode) to the second channel mode (e.g., a dedicated channel mode). After transitioning to the second channel mode, the stimulator packet can be communicated from the called communication device to the second network access point on the fourth communications channel at the second data transfer rate. In this scenario, the calling and called communication devices advantageously transition from their first channel modes to their second channel modes at substantially the same time. In effect, the total time for channel transition is substantially reduced (e.g., reduced by approximately 50%) as compared to that of conventional communication systems.

Notably, the present invention overcomes various drawbacks of conventional implementing systems and methods for providing voice and data communications over a cellular network. For example, the present invention provides a reduced delay in the transmission of voice and/or data packets (or latency) when establishing a call as compared to that of conventional communication systems. Also, the present invention minimizes or eliminates gaps that may occur in speech communications when communication devices (e.g., mobile phones) transition between channel modes. The delay (or latency) reduction and gap minimization/elimination features of the present invention will become more evident as the discussion progresses.

The present invention will now be described in relation to voice communications, and more particularly PTT voice communications. However, the present invention is not limited in this regard. For example, the present invention is applicable in situations where there is a need for a relatively fast call/connection establishment in communication systems.

Figure 1:
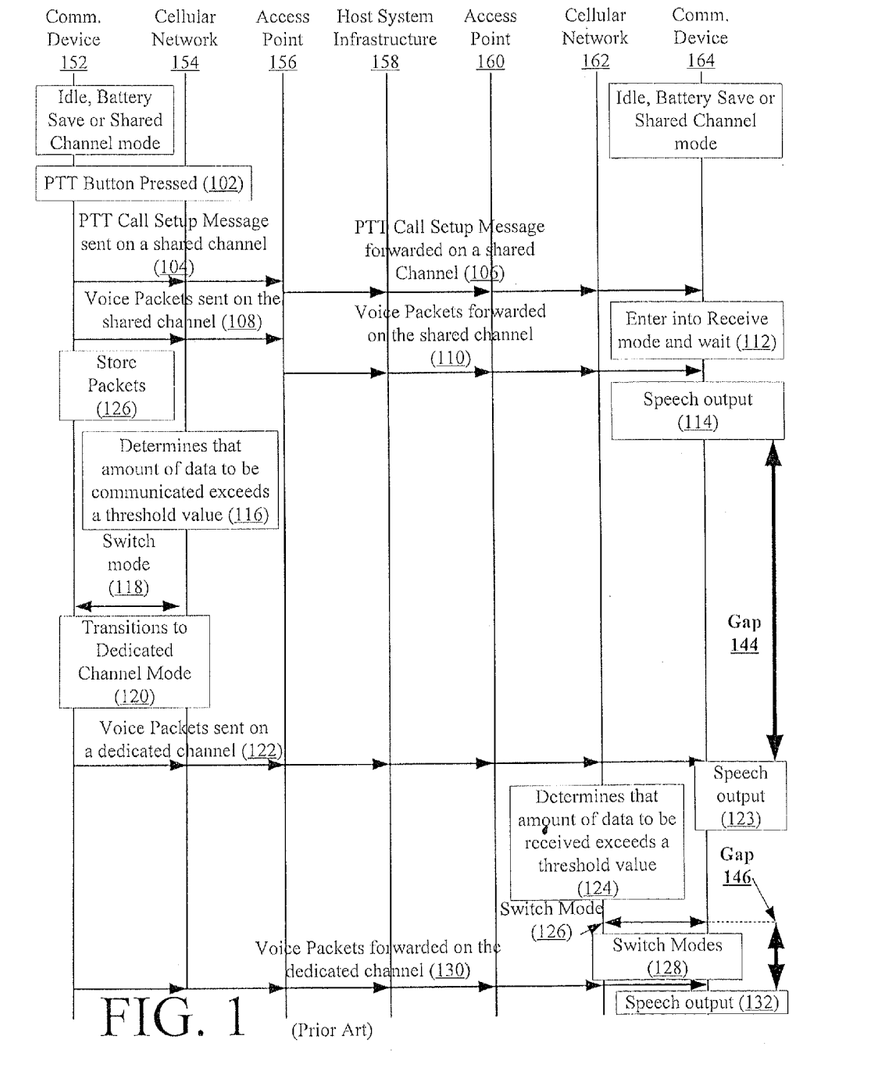
FIG. 1 is a flow diagram of a conventional method for providing data communications over a cellular network that is useful for understanding the present invention.

Conventional Method for Providing PTT Voice Communication Over a Cellular Network Referring now to FIG. 1, there is provided a flow diagram of a conventional process for providing PTT voice communications over a conventional cellular network based system that is useful for understanding the delay (or latency) reduction and gap minimization/elimination features of the present invention. The conventional cellular network based system is configured to provide a PTT service to PTT service subscribers using communication devices. The PTT service is an instant service by which a PTT service subscriber is able to immediately talk to one or more other PTT service subscribers by pushing a PTT button of the communication device.

As shown in FIG. 1, the cellular network based system includes conventional communication devices 152, 164, cellular networks 154, 162, access points 156, 160 and a host system infrastructure (e.g., a switch) 158. Each of the conventional components 152, 164, 154, 162, 156, 160, 158 is well known to those having ordinary skill in the art, and therefore will not be described herein. However, it should be understood that the communication devices 152, 164 are in their idle modes, battery save modes or a shared channel modes. The idle and battery save modes of communication devices 152, 164 are well known to those having ordinary skill in the art, and therefore will not be described herein. The cellular networks 154, 162 are selected to be WCDMA based networks for clarity and ease of discussion.

During operation, a user presses a PTT button of the calling communication device 152 as shown by step 102. In response to the depression of the PTT button, the calling communication device 152 generates a PTT call setup message as shown by step 104. The PTT call setup message includes, but is not limited to, information indentifying the type of call (e.g., individual or group call) and the communication devices that are being called. The PTT call setup message is sent from the calling communication device 152 to access point 156 via the cellular network 154 on a shared channel in an air interface as also shown by step 104. At step 106, the access point 156 forwards the PTT call setup message to the access point 160 via the host system infrastructure (e.g., a switch) 158. In turn, the access point 160 forwards the PTT call setup message to the called communication device 164 via the cellular network 162 on a shared channel in an air interface. Upon receipt of the PTT call setup message, the called communication device 164 enters into a receive mode and waits for voice packets from the calling communication device 152 as shown by step 112.

Subsequent to transmitting the PTT call set up message, the calling communication device 152 records and sends voice packets to the access point 156 via the cellular network 154 on a shared channel in an air interface as shown by step 108. At step 110, the voice packets are forwarded from access point 156 to access point 160 via the host system infrastructure (e.g., a switch) 158. In turn, access point 160 forwards the voice packets to the called communication device 164 via cellular network 162 on a shared channel in an air interface. At the called communication device 164, the voice packets are processed and speech is output to a user via a user interface (e.g., a speaker) thereof as shown by step 114.

While the user of the calling communication device 152 continues to speak into a microphone thereof, the calling communication device 152 records and queues voice packets at step 126. Also, the cellular network 154 performs operations for determining if the actual or predicted amount of data to be communicated from the calling communication device 152 exceeds a threshold value. This determination is performed at step 116. If the cellular network 154 determines that the actual or predicted amount of data to be communicated from the calling communication device 152 exceeds the threshold value, then step 118 is performed. In step 118, the cellular network 154 performs operations for stimulating a switch from the shared channel mode to a dedicated channel mode. The channel mode switch is accomplished by the exchange of communications between the cellular network 154 and the calling communication device 152. Notably, these exchanged communications can be performed outside of the PTT application's control. As a result of these exchanged communications, the equipment of the cellular network 154 (e.g., a base station) switches from its shared channel mode to its dedicated channel mode as shown by step 120. Similarly, the calling communication device 152 switches from its shared channel mode to its dedicated channel mode at step 120 as also shown by step 120.

Subsequent to the channel mode switch, voice packets are sent from the calling communication device 152 to the access point 156 via cellular network 154 on a dedicated channel as shown by step 122. The access point 156 forwards the voice packets to the access point 160 via the host system infrastructure (e.g., a switch) 158 as also shown by step 122. In turn, the access point 160 forwards the voice packets to the called communication device 164 via the cellular network 162 on a shared channel in an air interface as further shown by step 122. At the called communication device 164, the voice packets are processed and speech is output to a user via a user interface (e.g., a speaker) thereof as shown by step 123.

At the cellular network 162, operations are performed by the cellular network 162 for determining if the actual or predicted amount of data to be received at the called communication device 164 exceeds a threshold value as shown by step 124. If the cellular network 162 determines that the actual or predicted amount of data to be received at the called communication device 164 exceeds the threshold value, the cellular network 162 will perform operations for stimulating a switch from the shared channel mode to a dedicated channel mode as shown by step 126. The channel mode switch is accomplished by the exchange of communications between the cellular network 162 and the called communication device 164. As a result of these communications, the equipment of the cellular network 162 (e.g., a base station) switches from its shared channel mode to its dedicated channel mode as shown by step 128. Similarly, the called communication device 164 switches from its shared channel mode to its dedicated channel mode as also shown by step 128.

Subsequent to the channel mode switch, voice packets are sent from the calling communication device 152 to the access point 156 via cellular network 154 on a dedicated channel as shown by step 130. The access point 156 forwards the voice packets to the access point 160 via the host system infrastructure (e.g., a switch) 158 as also shown by step 130. In turn, the access point 160 forwards the voice packets to the called communication device 164 via the cellular network 162 on a dedicated channel as further shown by step 130. At the called communication device 164, the voice packets are processed and speech is output to a user via a user interface (e.g., a speaker) thereof as shown by step 132.

Notably, the calling communication device 152 will not transmit voice packets while it is transitioning from its shared channel mode to its dedicated channel mode. Likewise, the called communication device 164 will not receive voice packets when it is transitioning from its shared channel mode to its dedicated channel mode. In effect, interruptions in speech communications occurs. These interruptions in speech communications are illustrated in FIG. 1 by time gaps 144 and 146. These interruptions in speech communications 144, 146 are undesirable from the point of view of speech quality.

Accordingly, the present invention provides improved systems and methods for providing data communications over a cellular network. The improved systems and methods minimize the latency when communication devices transition between channel modes. The improved systems and method also minimize or eliminate the gaps 144, 146 that occur in speech communications when communication devices transition between channel modes. An exemplary improved system will be described below in relation to FIGS. 2-4. Exemplary improved methods for providing data communications over a cellular network will be described below in relation to FIGS. 5-8.

Exemplary Communication System Implementing the Present Invention

Figure 2:
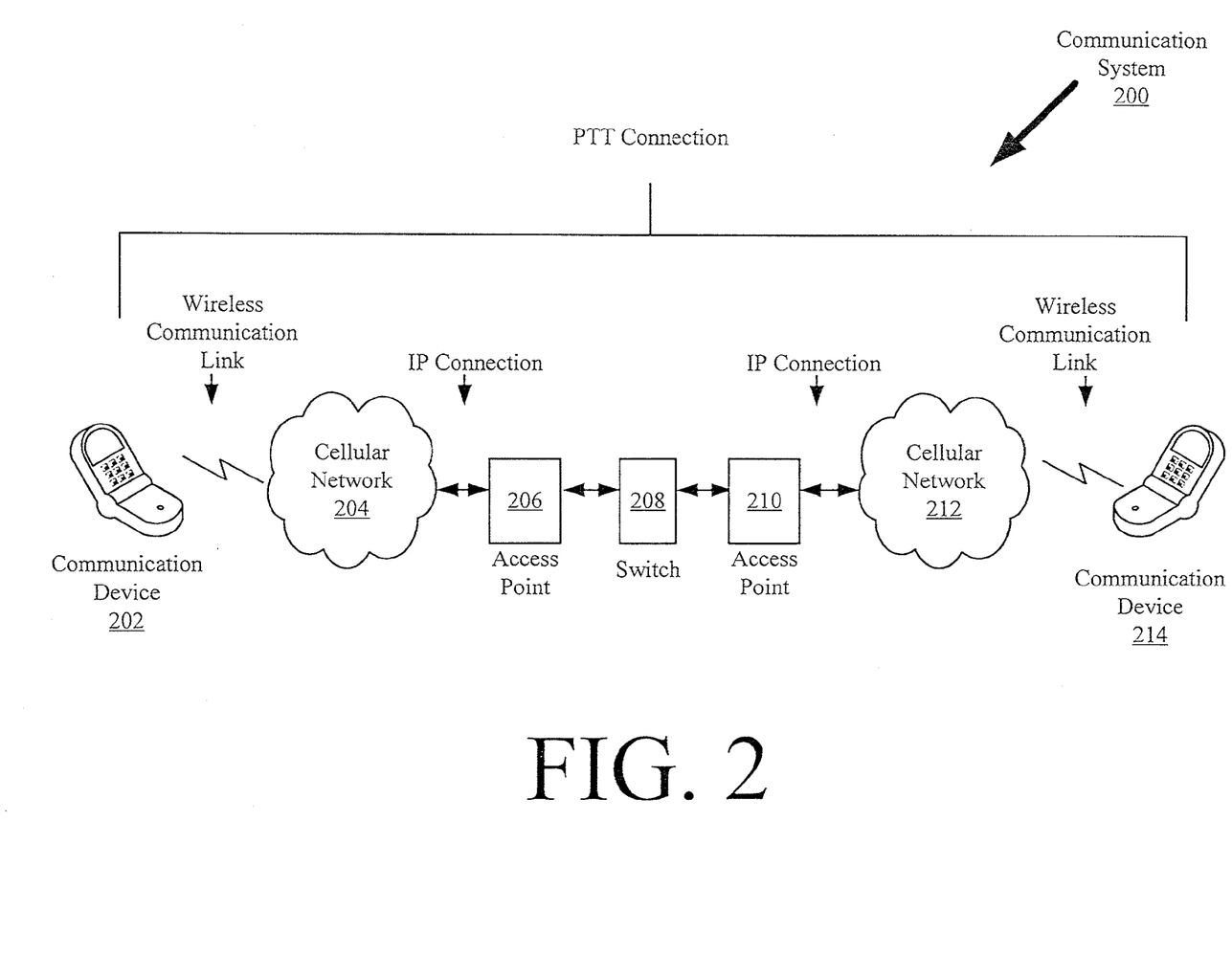
FIG. 2 is a block diagram of an exemplary communication system that is useful for understanding the present invention.

Referring now to FIG. 2, there is provided a block diagram of a communication system 200 that implements one or more method embodiments of the present invention. The communication system 200 can be, but is not limited to, a third generation (3G) compatible system. The phrase "third generation (3G)", as used herein, refers to third-generation wireless telephone technology. As such, the communication system 200 supports various 3G data services (e.g., text messaging and video calls).

As shown in FIG. 2, the communication system 200 comprises communication devices 202, 214, cellular networks 204, 212, access points 206, 210 and host system infrastructure 208. The communication system 200 may include more or less components than those shown in FIG. 2. However, the components shown are sufficient to disclose an illustrative embodiment implementing the present invention. The hardware architecture of FIG. 2 represents one embodiment of a representative communication system configured to provide PTT services to PTT service subscribers. The PTT service is an instant service by which the PTT service subscriber is able to immediately talk to one or more other PTT service subscribers by pushing a key or button of a communication device 202, 214.

The access points 206, 210 allow for communications between the communication devices 202, 214 and/or host system infrastructure 208. As such, the access points 206, 210 can include, but are not limited to, data servers and other devices to which the cellular networks 204, 212 can connect via a connections (e.g., an Internet Protocol (IP) connection). The access points 202, 214 will be described in more detail below in relation to FIG. 4.

Cellular networks 204, 212 and host system infrastructure 208 are well known to those having ordinary skill in the art, and therefore will not be described in detail herein. However, it should be understood that the host system infrastructure 208 can include, but is not limited to, a switch system. The cellular networks 204, 212 can be the same type of network or different types of networks. For example, each of the cellular networks 204, 212 is a Wideband Code Division Multiple Access (WCDMA) based network. Alternatively, only one of the cellular networks 204, 212 is a WCDMA based network. In this scenario, the other network 204, 212 can be, but is not limited to, an LTE based network or an LTE Advanced based network. Embodiments of the present invention are not limited in this regard.

If a cellular network 204, 212 is a WCDMA based network, then it supports various modes of communication. These modes of communication include, but are not limited to, a shared channel mode and a dedicated channel mode. In the shared channel mode, PTT voice data is communicated between a communication device 202, 214 and an access point 206, 210 via the WCDMA based cellular network 204, 212 at a first data transfer rate (e.g., 16 Kilo-bits per second or 32 Kilo-bits per second) over a shared channel in an air interface. In the dedicated channel mode, PTT voice data is communicated between a communication device 202, 214 and an access point 206, 210 via the WCDMA based cellular network 204, 212 at a second data transfer rate over a dedicated channel. The second data rate (e.g., 2 to 40 Mega-bits per second) is greater than the first data transfer rate.

During operation, the channel modes are dynamically switched from the shared channel mode to the dedicated channel mode when a data communication service (e.g., the PTT service) is utilized. Exemplary channel mode switching schemes will be explained in detail below in relation to FIGS. 5-8. However, it should be understood that the channel mode switching schemes of the present invention advantageously lowers the delay in setting up the calls. The present invention also advantageously reduces or eliminates interruptions in speech which may occur when the communication devices 202, 214 transition between channel modes. In effect, the present invention provides improved speech quality as compared to conventional communication systems.

Figure 3:
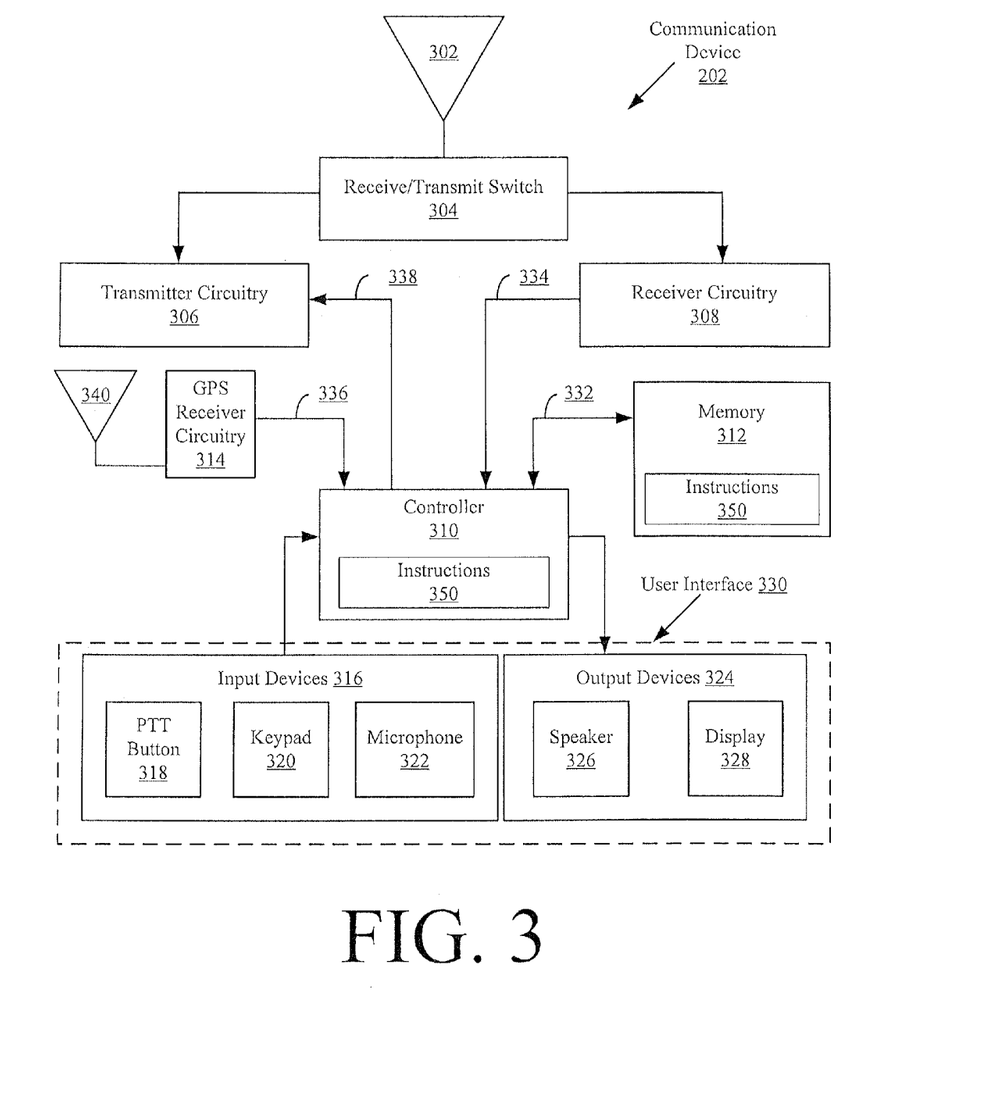
FIG. 3 is more detailed block diagram of an exemplary communication device shown in FIG. 2.

Referring now to FIG. 3, there is provided a more detailed block diagram of the communication device 202 shown in FIG. 2. The communication device 214 is the same as or similar to the communication device 202. As such, the following discussion of the communication device 202 is sufficient for understanding the communication device 214 of FIG. 2. Notably, the communication device 202 may include more or less components than those shown in FIG. 3. For example, the communication device 202 can be absent of various components shown in FIG. 3, such as components 340, 314 (described below) and electrical connection 336 (described below). However, the components shown are sufficient to disclose an illustrative embodiment implementing the present invention. The hardware architecture of FIG. 3 represents one embodiment of a representative communication device configured to facilitate the provision of a PTT service to a PTT service subscriber.

As shown in FIG. 3, the communication device 202 comprises an antenna 302 for receiving and transmitting Radio Frequency (RF) signals. A receive/transmit (Rx/Tx) switch 304 selectively couples the antenna 302 to the transmitter circuitry 306 and receiver circuitry 308 in a manner familiar to those skilled in the art. The receiver circuitry 308 demodulates and decodes the RF signals received from a cellular network (e.g., the cellular network 204 of FIG. 2) to derive information therefrom. The receiver circuitry 308 is coupled to a controller 310 via an electrical connection 334. The receiver circuitry 308 provides the decoded RF signal information to the controller 310. The controller 310 uses the decoded RF signal information in accordance with the function(s) of the communication device 202.

The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the RF signals to the antenna 302 for transmission to an external device (e.g., a base station of cellular network 204 of FIG. 2).

An antenna 340 is coupled to Global Positioning System (GPS) receiver circuitry 314 for receiving GPS signals. The GPS receiver circuitry 314 demodulates and decodes the GPS signals to extract GPS location information therefrom. The GPS location information indicates the location of the communication device 202. The GPS receiver circuitry 314 provides the decoded GPS location information to the controller 310. As such, the GPS receiver circuitry 314 is coupled to the controller 310 via an electrical connection 336. The controller 310 uses the decoded GPS location information in accordance with the function(s) of the communication device 202.

The controller 310 stores the decoded RF signal information and the decoded GPS location information in a memory 312 of the communication device 202. Accordingly, the memory 312 is connected to and accessible by the controller 310 through an electrical connection 332. The memory 312 may be a volatile memory and/or a non-volatile memory. For example, the memory 312 can include, but is not limited to, a Random Access Memory (RAM), a Dynamic Random Access Memory (DRAM), a Static Random Access Memory (SRAM), Read-Only Memory (ROM) and flash memory.

As shown in FIG. 3, one or more sets of instructions 350 are stored in the memory 312. The instructions 350 can also reside, completely or at least partially, within the controller 310 during execution thereof by the communication device 202. In this regard, the memory 312 and the controller 310 can constitute machine-readable media. The term "machine-readable media", as used here, refers to a single medium or multiple media that store the one or more sets of instructions 350. The term "machine-readable media", as used here, also refers to any medium that is capable of storing, encoding or carrying the set of instructions 350 for execution by the communication device 202 and that cause the communication device 202 to perform one or more of the methodologies of the present disclosure.

The controller 310 is also connected to a user interface 330. The user interface 330 is comprised of input devices 316, output devices 324, and software routines (not shown in FIG. 3) configured to allow a user to interact with and control software applications (not shown in FIG. 3) installed on the computing device 202. Such input and output devices include, but are not limited to, a display 328, a speaker 326, a keypad 320, a directional pad (not shown in FIG. 3), a directional knob (not shown in FIG. 3), a microphone 322 and a PTT button 318. The display 328 may be designed to accept touch screen inputs. As such, user interface 330 can facilitate a user-software interaction for launching PTT applications (not shown in FIG. 3) and other types of applications installed on the computing device 202.

The display 328, a keypad 320, a directional pad (not shown in FIG. 3) and a directional knob (not shown in FIG. 3) can collectively provide a user with a means to initiate one or more data applications or functions of the communication device 202. The data applications can facilitate the provision of data communication services to the user using the communication device 202. As such, the data applications are operative to perform data communication operations. The data communication operations can include, but are not limited to, message generation operations, message communication operations, data packet recording operations, data packet queuing operations, data packet communication operations and channel mode switching operations. The channel mode switching operations are performed to at least stimulate a channel mode switch at the communication device 202 and/or at equipment of a cellular network (e.g., cellular network 204 of FIG. 2).

The PTT button 318 is given a form factor so that a user can easily access the PTT button 318. For example, the PTT button 318 can be taller than other keys or buttons of the communication device 202. Embodiments of the present invention are not limited in this regard. The PTT button 318 provides a user with a single key/button press to initiate a predetermined PTT application or function of the communication device 202. The PTT application facilitates the provision of a PTT service to a PTT service subscriber using the communication device 202. As such, the PTT application is operative to perform PTT communication operations. The PTT communication operations can include, but are not limited to, message generation operations, message communication operations, voice packet recording operations, voice packet queuing operations, voice packet communication operations and channel mode switching operations. The channel mode switching operations are performed to at least stimulate a channel mode switch at the communication device 202 and/or at equipment of a cellular network (e.g., cellular network 204 of FIG. 2).

Figure 4:
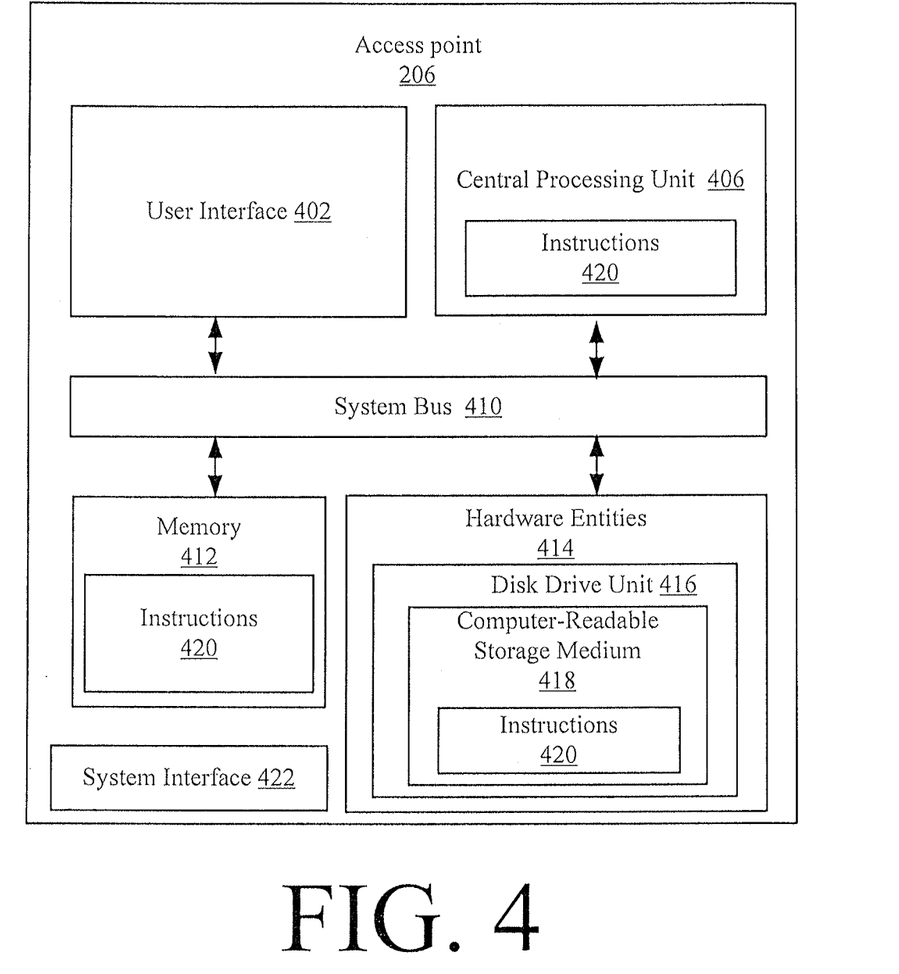
FIG. 4 is a more detailed block diagram of an exemplary access point shown in FIG. 2.

Referring now to FIG. 4, there is provided a more detailed block diagram of the access point 206 shown in FIG. 2 that is useful for understanding the present invention. The access point 210 is the same as or similar to the access point 206. As such, the following discussion of the access point 206 is sufficient for understanding the access point 210 of FIG. 2. Notably, the access point 206 may include more or less components than those shown in FIG. 4. However, the components shown are sufficient to disclose an illustrative embodiment implementing the present invention. The hardware architecture of FIG. 4 represents one embodiment of a representative access point configured to facilitate the provision of PTT services to PTT service subscribers.

As shown in FIG. 4, the access point 206 includes a system interface 422, a user interface 402, a Central Processing Unit (CPU) 406, a system bus 410, a memory 412 connected to and accessible by other portions of access point 206 through system bus 410, and hardware entities 414 connected to system bus 410. At least some of the hardware entities 414 perform actions involving access to and use of memory 412, which may be a random access memory (RAM), a disk driver, and/or a compact disc read only memory (CD-ROM).

System interface 422 allows the access point 206 to communicate directly or indirectly with external communication devices (e.g., communication device 202 of FIG. 2). If the access point 206 is communicating indirectly with the external communication device, then the access point 206 is sending and receiving communications through the common wireless network (e.g., the cellular network 204 shown in FIG. 2).

Hardware entities 414 may include microprocessors, application specific integrated circuits (ASICs) and other hardware. Hardware entities 414 may include a microprocessor programmed for facilitating the provision of data communication service and/or PTT services (i.e., voice over data communication services) to PTT service subscribers. In this regard, it should be understood that the microprocessor can access and run a data communication applications and/or PTT service application installed on the access point 206. The data communication applications are operative to perform data communication operations. The data communication operations can include, but are not limited to, message forwarding operations, data packet forwarding operations and channel mode switching operations. Similarly, the PTT service application is operative to perform PTT communication operations. The PTT communication operations can include, but are not limited to, message forwarding operations, voice packet forwarding operations and channel mode switching operations. The channel mode switching operations are performed to stimulate a channel mode switch at a communication device (e.g., the communication device 202 of FIG. 2) and/or at equipment of a cellular network (e.g., cellular network 204 of FIG. 2).

As shown in FIG. 4, the hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the access point 206. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the access point 206 and that cause the access point 206 to perform any one or more of the methodologies of the present disclosure.

As evident from the above discussion, the communication system 200 implements one or more method embodiments of the present invention. The method embodiments of the present invention lowers the delay in setting up the calls. The method embodiments of the present invention also minimize and/or eliminate gaps (e.g., gaps 144, 146 shown in FIG. 1) that may occur in speech communication when the communication devices 202, 214 transition between channel modes. Exemplary method embodiments of the present invention will now be described in relation to FIGS. 5-8.

Exemplary Method Embodiments of the Present Invention

Figure 5:
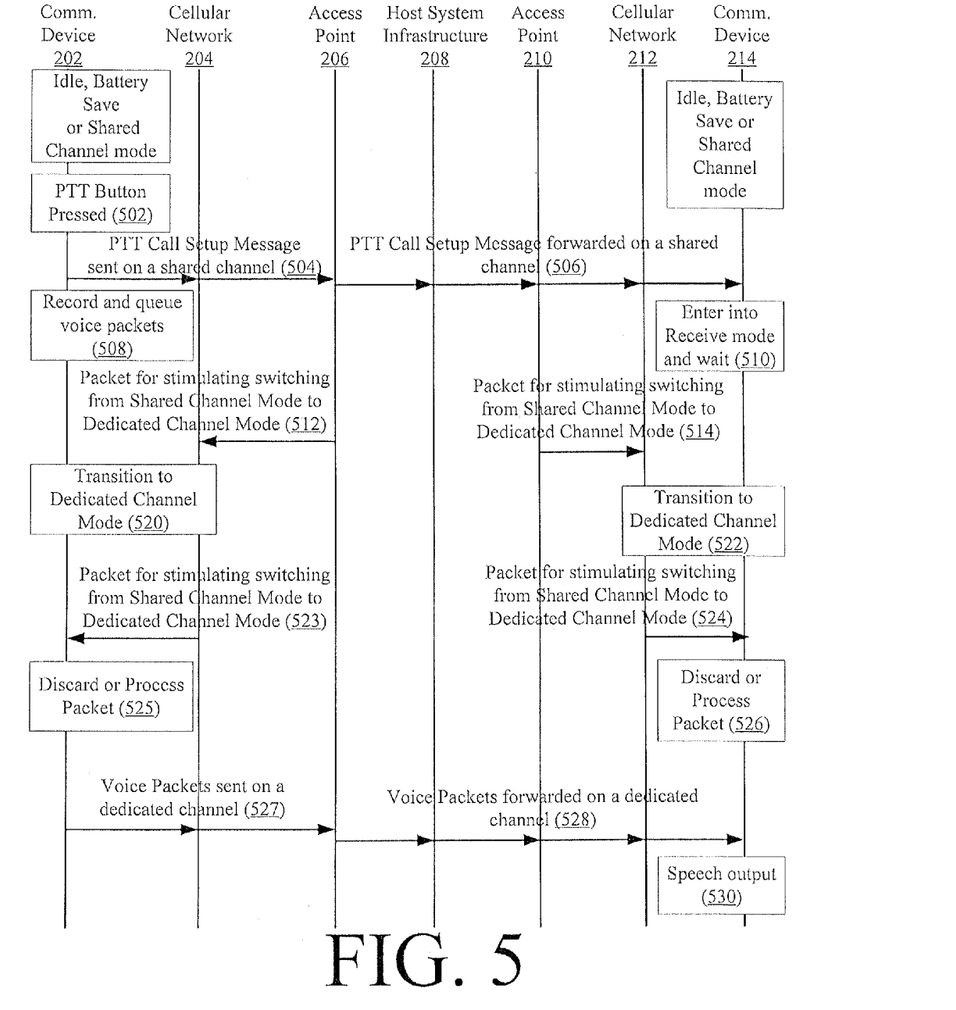
FIG. 5 is a flow diagram of an exemplary method for providing data communications over a cellular network that is useful for understanding the present invention.
Figure 6:
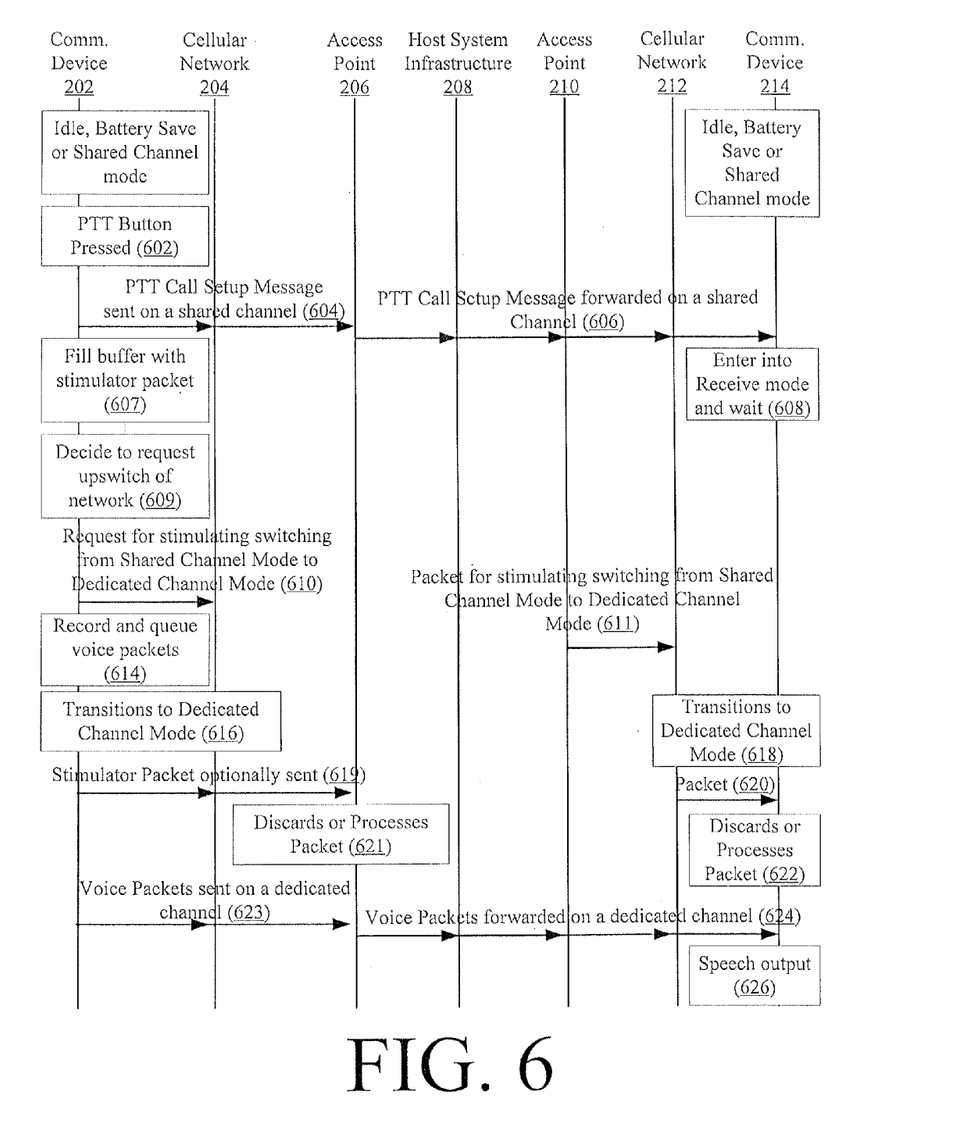
FIG. 6 is a flow diagram of another exemplary method for providing data communications over a cellular network that is useful for understanding the present invention.
Figure 7:
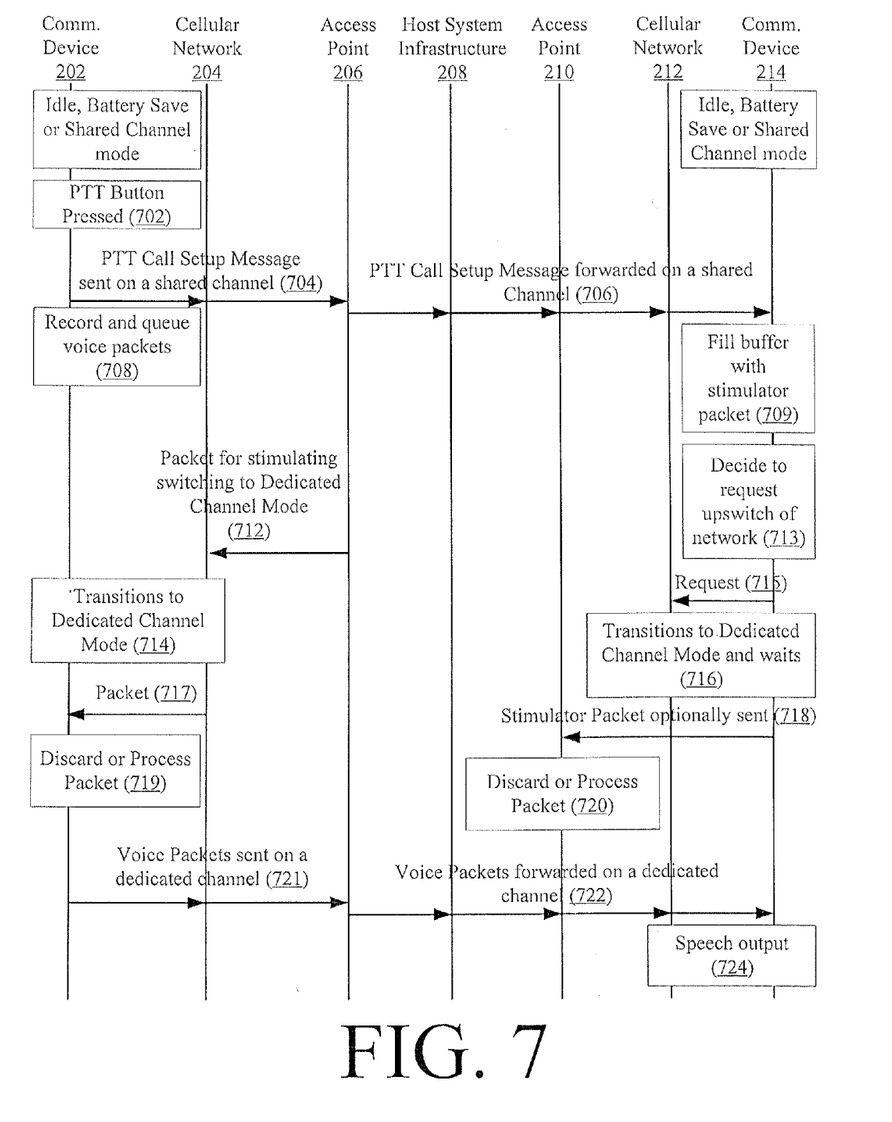
FIG. 7 is a flow diagram of another exemplary method for providing data communications over a cellular network that is useful for understanding the present invention.
Figure 8:
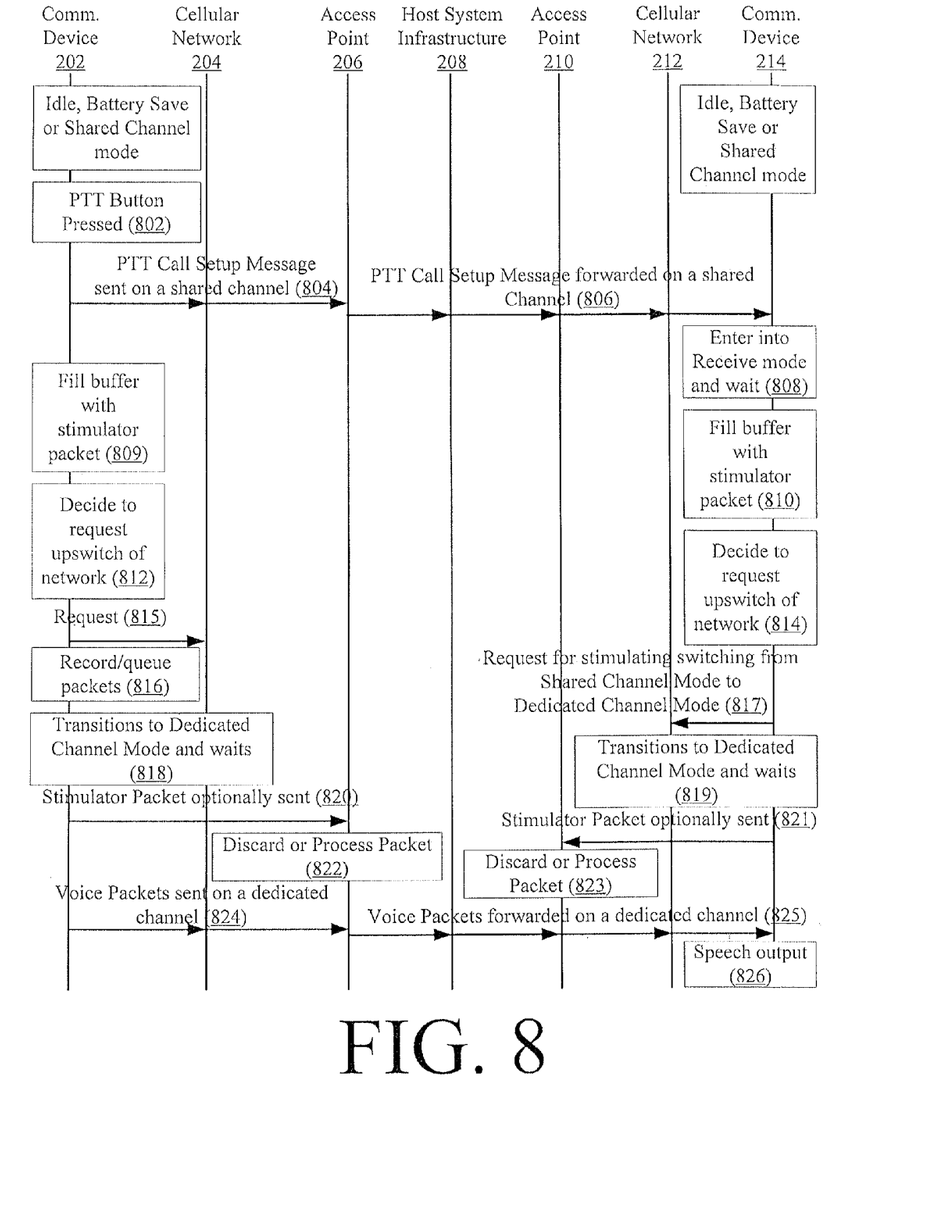
FIG. 8 is a flow diagram of yet another exemplary method for providing data communications over a cellular network that is useful for understanding the present invention.

Each of the FIGS. 5-8 provides a flow diagram of an exemplary method for providing PTT voice communications over a cellular network based communication system 200 that is useful for understanding the present invention. More particularly, FIG. 5 shows an exemplary method in which the access points 206, 210 perform operations for stimulating channel mode switches at the communication devices 202, 214 and equipment of the cellular networks 204, 212 (e.g., base stations). FIG. 6 shows an exemplary method in which the calling communication device 202 and access point 210 perform operations for stimulating the channel mode switches. FIG. 7 shows an exemplary method in which the access point 206 and called communication device 214 perform operations for stimulating the channel mode switches. FIG. 8 shows an exemplary method in which the calling and called communication devices 202, 214 perform operations for stimulating the channel mode switches.

Notably, in each of the methods shown in FIGS. 5-8, the communication devices 202, 214 transition from their shared channel modes to their dedicated channel modes at the same time or substantially the same time (e.g., within milliseconds of each other). The channel mode transitions occur prior to speech communications. Consequently, the delay in setting up the calls is lowered. Also, the gaps (e.g., gaps 144, 146 shown in FIG. 1) that may occur in the speech communications of a cellular network based communication systems may be reduced or eliminated.

Referring now to FIG. 5, a first exemplary method of the present invention will be described that is useful for understanding the present invention. As noted above, the communication system 200 is configured to provide a PTT service to PTT service subscribers using communication devices 202, 214. The PTT service is an instant service by which a PTT service subscriber is able to immediately talk to one or more other PTT service subscribers by pushing a PTT button 318 of a communication device 202, 214.

As also noted above and shown in FIG. 5, the communication system 200 includes communication devices 202, 214 and cellular networks 204, 212. The communication devices 202, 214 are in their idle modes, battery save modes or a shared channel modes. The idle and battery save modes of communication devices 202, 214 are well known to those having ordinary skill in the art, and therefore will not be described herein. The cellular networks 204, 212 are selected to be WCDMA based networks for clarity and ease of discussion. However, embodiments of the present invention are not limited in this regard.

During operation, a user presses a PTT button 318 of the calling communication device 202 as shown by step 502. In response to the depression of the PTT button 318, the calling communication device 202 generates a PTT call setup message as shown by step 504. The PTT call setup message includes, but is not limited to, information indentifying the type of call (e.g., individual or group call) and the communication devices that are being called. The PTT call setup message is sent from the calling communication device 202 to the access point 206 via the cellular network 204 on a shared channel in an air interface as also shown by step 504. Subsequent to transmitting the PTT call set up message, the calling communication device 202 records and queues voice packets as shown by step 508.

In response to receiving the PTT call setup message, the access point 206 forwards the PTT call setup message to the access point 210 via the host system infrastructure 208 as shown by step 506. In turn, the access point 210 forwards the PTT call setup message to the called communication device 214 via the cellular network 212 on a shared channel in an air interface as also shown by step 506. Upon receipt of the PTT call setup message, the called communication device 214 enters into a receive mode and waits for voice packets from the calling communication device 202 as shown by step 510.

In response to receiving the PTT call setup message, each of the access points 206, 210 performs channel mode switching operations as shown by step 512 and 514. The channel mode switching operations are performed to stimulate a channel mode switch at the respective communication device 202, 214 and equipment of the respective cellular network 204, 212 (e.g., base stations). The channel mode switching operations generally involve communicating a stimulator packet to the cellular network 204, 212 on a shared channel in an air interface. The stimulator packet includes data of an amount equal to or greater than a particular threshold value.

Notably, the stimulator packet can be pre-stored in a memory device of the access point 206, 210 or dynamically generated by the access point 206, 210 in response to receipt of a PTT call setup message. If the stimulator packet is pre-stored in the access point 206, 210, then it includes, but is not limited to, stuff data. If the stimulator packet is dynamically generated at the access point 206, 210, then it includes stuff data and/or non-stuff data. The non-stuff data includes, but is not limited to, management data, control data, configuration data, contact list information, PTT subscriber information, communication device status information and/or GPS location information. There are various advantages of sending non-stuff data in a stimulator packet. For example, the inclusion of non-stuff data in a stimulator packet enhances voice communications by reducing the overall amount of data sent during speech communications.

Upon receipt of the stimulator packets, each of the cellular networks 204, 212 exchanges communications with the respective communication devices 202, 214 as shown by steps 520, 522. Consequently, the communication devices 202, 214 and the equipment of the cellular networks 204, 212 transition from their shared channel modes to their dedicated channel modes. Notably, the calling communication device 202 will not transmit voice packets while it is transitioning from its shared channel mode to its dedicated channel mode. Likewise, the called communication device 214 will not receive voice packets when it is transitioning from its shared channel mode to its dedicated channel mode.

After the channel mode transition, the stimulator packet can optionally be communicated from the cellular networks 204, 212 to the communication devices 202, 214 as shown by steps 523 and 524. Upon receipt of the stimulator packets, the communication devices 202, 214 discard or process the packet as shown by steps 525 and 526.

Subsequent to the completion of steps 525 and 526, voice packets are sent from the calling communication device 202 to the access point 206 via cellular network 204 on a dedicated channel as shown by step 527. As shown by step 528, the access point 206 forwards the voice packets to the access point 210 via the host system infrastructure 208. In turn, the access point 210 forwards the voice packets to the called communication device 214 via the cellular network 212 on a dedicated channel as also shown by step 528. At the called communication device 214, the voice packets are processed and speech is output to a user via a user interface (e.g., a speaker) thereof as shown by step 530. Notably, the speech is output without gaps 144, 146 shown in FIG. 1. The elimination of gaps 144, 146 is achieved by: (a) stimulating simultaneous or substantially simultaneous (e.g., within 100-150 milliseconds of each other) channel mode switches by the communication devices 202, 214; and (b) performing the channel mode switches prior to speech communications as shown by steps 520, 522, 527 and 528.

Notably, as a result of simultaneously or substantially simultaneously performing steps 512 and 514, the latency is minimized when communication devices transition between channel modes. Also, audio may not output from the receiving communication device 214 prior to the upswitches or communication mode switches that occur at steps 520 and 522.

Referring now to FIG. 6, a second exemplary method of the present invention will be described that is useful for understanding the present invention. As noted above and shown in FIG. 6, the communication devices 202, 214 are in their idle modes, battery save modes or a shared channel modes. The cellular networks 204, 212 are selected to be WCDMA based networks for clarity and ease of discussion. However, embodiments of the present invention are not limited in this regard.

During operation, a user presses a PTT button 318 of the calling communication device 202 as shown by step 602. In response to the depression of the PTT button 318, the calling communication device 202 generates a PTT call setup message as shown by step 604. The PTT call setup message includes, but is not limited to, information indentifying the type of call (e.g., individual or group call) and the communication devices that are being called. The PTT call setup message is sent from the calling communication device 202 to the access point 206 via the cellular network 204 on a shared channel in an air interface as also shown by step 604. In response to receiving the PTT call setup message, the access point 206 forwards the PTT call setup message to the access point 210 via the host system infrastructure 208 as shown by step 606. In turn, the access point 210 forwards the PTT call setup message to the called communication device 214 via the cellular network 212 on a shared channel in an air interface as also shown by step 606. Upon receipt of the PTT call setup message, the called communication device 214 enters into a receive mode and waits for voice packets from the calling communication device 202 as shown by step 608.

Subsequent to transmitting the PTT call set up message, the calling communication device 202 performs channel mode switching operations to stimulate a channel mode switch as shown by steps 607, 609 and 610. The calling communication device 202 also records and queues voice packets as shown by step 614.

In step 607, one or more buffers of the calling communication device 202 are filled with a stimulator packet. The stimulator packet includes data of an amount equal to or greater than a particular threshold value. The stimulator packet can be pre-stored in the memory 312 of the communication device 202 or dynamically generated by the communication device 202 in response to the transmission of a PTT call setup message. The stimulator packet comprises stuff data and/or non-stuff data of an amount equal to or greater than a threshold value. The non-stuff data includes, but is not limited to, management data, control data, configuration data, contact list information, PTT subscriber information, communication device status information and/or GPS location information. As a consequence of step 607, the calling communication device 202 decides to request an upswitch as shown by step 609. Thereafter, step 610 is performed where the calling communication device 202 sends a request to the cellular network 204 on the shared channel in an air interface.

Upon receipt of the request, the cellular network 204 exchanges communications with the calling communication device 202 as shown by step 616. As a result of these communications, the calling communication device 202 and the equipment of the cellular network 204 transition from their shared channel modes to their dedicated channel modes.

After completion of the channel mode change, the calling communication device 202 can optionally send the stimulator packet to the access point 206 via the cellular network 204 on the dedicated channel as shown by step 619. Upon receipt of the stimulator packet, the access point 206 discards or processes the packet as shown by step 621.

Although steps 614 and 616 are shown in FIG. 6 to occur in series, embodiments of the present invention are not limited in this regard. For example, steps 614 and 616 may occur in parallel rather than series. Notably, the communication device 202 will not transmit voice packets while it is transitioning from its shared channel mode to its dedicated channel mode.

At the same time or substantially the same time as step 610 is being performed, the access point 210 performs channel mode switching operations to stimulate a channel mode switch as shown by step 611. The channel mode switching operations generally involve communicating a stimulator packet to the cellular network 212 on a shared channel in an air interface. Notably, the stimulator packet sent from the access point 210 can be the same size as or a different size than the stimulator packet of step 607. Notably, the stimulator packet can be pre-stored in the memory of the access point 210 or dynamically generated by the access point 210 in response to a receipt of the PTT call setup message.

Upon receipt of the stimulator packet, the cellular network 212 (e.g., a base station) performs channel mode switching operations. The channel mode switching operations generally involve exchanging communications with the called communication device 214. As a result of these communications, the equipment of the cellular network 212 (e.g., a base station) switches from its shared channel mode to its dedicated channel mode. Similarly, the calling communication device 214 switches from its shared channel mode to its dedicated channel mode. After completion of step 618, the cellular network 212 optionally forwards the stimulator packet to the communication device 214. At the communication device 214, the stimulator packet is discarded or processed as shown by step 622.

Subsequent to the channel mode switches, voice packets are sent from the calling communication device 202 to the access point 206 via cellular network 204 on a dedicated channel as shown by step 623. The access point 206 forwards the voice packets to the access point 210 via the host system infrastructure 208 as shown by step 624. In turn, the access point 210 forwards the voice packets to the called communication device 214 via the cellular network 212 on a dedicated channel. At the called communication device 214, the voice packets are processed and speech is output to a user via a user interface (e.g., a speaker) thereof as shown by step 626.

Notably, the speech may be output without gaps 144, 146 shown in FIG. 1, i.e., speech is not output from the receiving communication device 214 prior to the upswitches or communication mode switches that occur at steps 616 and 618. The elimination of gaps 144, 146 is achieved by: (a) stimulating substantially simultaneous (e.g., within milliseconds of each other) channel mode switches by the communication devices 202, 214; and (b) performing the channel mode switches prior to speech communications as shown by step 623 and 624. Also as a result of simultaneously or substantially simultaneously performing steps 616 and 618, the latency is minimized when communication devices transition between channel modes.

FIG. 7 is a third exemplary method of the present invention will be described that is useful for understanding the present invention. As noted above and shown in FIG. 7, the communication devices 202, 214 are in their idle modes, battery save modes or a shared channel modes. The cellular networks 204, 212 are selected to be WCDMA based networks for clarity and ease of discussion. However, embodiments of the present invention are not limited in this regard.

During operation, a user presses a PTT button 318 of the calling communication device 202 as shown by step 702. In response to the depression of the PTT button 318, the calling communication device 202 generates a PTT call setup message as shown by step 704. The calling communication device 202 also records and queues voice packets as shown by step 708. The PTT call setup message includes, but is not limited to, information indentifying the type of call (e.g., individual or group call) and the communication devices that are being called. The PTT call setup message is sent from the calling communication device 202 to the access point 206 via the cellular network 204 on a shared channel in an air interface as also shown by step 704. In response to receiving the PTT call setup message, the access point 206 forwards the PTT call setup message to the access point 210 via the host system infrastructure 208 as shown by step 706. In turn, the access point 210 forwards the PTT call setup message to the called communication device 214 via the cellular network 212 on a shared channel in an air interface as also shown by step 706.

Upon receipt of the PTT call setup message, the access point 206 and the called communication device 214 perform channel mode switching operations to stimulate channel mode switches as shown by steps 709 and 712. The channel mode switching operations of the access point 206 generally involve communicating stimulator packets to cellular network 204 on a shared channel in an air interface. The stimulator packet includes data of an amount equal to or greater than a particular threshold value. The stimulator packet can be pre-stored in the memory of the access point 206 or dynamically generated by the access point 206 in response to the receipt and/or transmission of a PTT call setup message. The stimulator packet comprises stuff data and/or non-stuff data of an amount equal to or greater than a threshold value. The non-stuff data includes, but is not limited to, management data, control data, configuration data, contact list information, PTT subscriber information, communication device status information and/or GPS location information.

In response to the stimulator packet, the equipment of the cellular network 204 (e.g., base stations) performs channel mode switching operations as shown by step 714. The channel mode switching operations generally involve exchanging communications with the communication device 202. As a result of these communications, the equipment of the cellular network 204 (e.g., a base station) switches from its shared channel mode to its dedicated channel mode. Similarly, the communication device 202 switches from its shared channel mode to its dedicated channel mode. Notably, the communication device 202 will not transmit voice packets while it is transitioning from its shared channel mode to its dedicated channel mode. After completion of step 714, the cellular network 204 can optionally forward the stimulator packet to the communication device 202 in a dedicated channel as shown by step 717. At the communication device 202, the stimulator packet is discarded or processed as shown by step 719.

The channel mode switching operations of the communication device 214 generally involve filling one or more buffers thereof with a stimulator packet as shown by step 709. The stimulator packet includes data of an amount equal to or greater than a particular threshold value. The stimulator packet can be pre-stored in the memory of the communication device 214 or dynamically generated by the communication device 214 in response to receipt of a PTT call setup message. The stimulator packet comprises stuff data and/or non-stuff data of an amount equal to or greater than a threshold value. The non-stuff data includes, but is not limited to, management data, control data, configuration data, contact list information, PTT subscriber information, communication device status information and/or GPS location information. In response to step 709, the communication device 214 decides to request on upswitch of the network as shown by step 713. Thereafter, the communication device 214 communicates the request to the cellular network 212 on a shared channel in an air interface as shown by step 715.

Upon receipt of the request, the cellular network 212 exchanges communications with the calling communication device 214 as shown by step 716. As a result of these communications, the calling communication device 214 and the equipment of the cellular network 212 transition from their shared channel modes to their dedicated channel modes.

After completion of the channel mode change, the calling communication device 214 can optionally send the stimulator packet to the access point 210 via the cellular network 212 on the dedicated channel as shown by step 718. Upon receipt of the stimulator packet, the access point 210 discards or processes the packet as shown by step 720.

Subsequent to the channel mode switches, voice packets are sent from the calling communication device 202 to the access point 206 via cellular network 204 on a dedicated channel as shown by step 721. The access point 206 forwards the voice packets to the access point 210 via the host system infrastructure 208 as shown by step 722. In turn, the access point 210 forwards the voice packets to the called communication device 214 via the cellular network 212 on a dedicated channel as also shown by step 722. At the called communication device 214, the voice packets are processed and speech is output to a user via a user interface (e.g., a speaker) thereof as shown by step 724. Notably, the speech is output without gaps 144, 146 shown in FIG. 1, i.e., speech is not output from the receiving communication device 214 prior to the upswitches or communication mode switches that occur at steps 714 and 718. The elimination of gaps 144, 146 is achieved by: (a) stimulating substantially simultaneous (e.g., within milliseconds of each other) channel mode switches by the communication devices 202, 214; and (b) performing the channel mode switches prior to speech communications as shown by steps 714, 716, 721 and 722. Also as a result of simultaneously or substantially simultaneously performing steps 714 and 716, the latency is minimized when communication devices transition between channel modes.

Referring now to FIG. 8, a fourth exemplary method of the present invention will be described that is useful for understanding the present invention. As noted above and shown in FIG. 8, the communication devices 202, 214 are in their idle modes, battery save modes or a shared channel modes. The cellular networks 204, 212 are selected to be WCDMA based networks for clarity and ease of discussion. However, embodiments of the present invention are not limited in this regard.

During operation, a user presses a PTT button 318 of the calling communication device 202 as shown by step 802. In response to the depression of the PTT button 318, the calling communication device 202 generates a PTT call setup message as shown by step 804. The PTT call setup message includes, but is not limited to, information indentifying the type of call (e.g., individual or group call) and the communication devices that are being called. The PTT call setup message is sent from the calling communication device 202 to the access point 206 via the cellular network 204 on a shared channel in an air interface. In response to receiving the PTT call setup message, the access point 206 forwards the PTT call setup message to the access point 210 via the host system infrastructure 208 as shown by step 806. In turn, the access point 210 forwards the PTT call setup message to the called communication device 214 via the cellular network 212 on a shared channel in an air interface. Upon receipt of the PTT call setup message, the called communication device 214 enters into a receive mode and waits for voice packets from the calling communication device 202 as shown by step 808.

Subsequent to transmitting the PTT call set up message, the calling communication device 202 performs channel mode switching operations to stimulate a channel mode switch as shown by steps 809, 812 and 815. The calling communication device 202 also records and queues voice packets as shown by step 816. The channel mode switching operations generally involve filling one or more buffers of the calling communication device 202 with a stimulator packet. The stimulator packet includes data of an amount equal to or greater than a particular threshold value. The stimulator packet can be pre-stored in the memory 312 of the communication device 202 or dynamically generated by the communication device 202 in response to the transmission of a PTT call setup message. The stimulator packet comprises stuff data and/or non-stuff data of an amount equal to or greater than a threshold value. The non-stuff data includes, but is not limited to, management data, control data, configuration data, contact list information, PTT subscriber information, communication device status information and/or GPS location information. In response to step 809, the calling communication device 202 decides to request an upswitch of the network as shown in step 812. Thereafter, the calling communication device 202 communicates the request to the cellular network 204 on a shared channel in an air interface as also shown by step 815.

In response to the request, the equipment of the cellular network 204 (e.g., a base station) performs channel mode switching operations as shown by step 818. The channel mode switching operations generally involve exchanging communications with the calling communication device 202. As a result of these communications, the equipment of the cellular network 204 (e.g., a base station) switches from its shared channel mode to its dedicated channel mode. Similarly, the calling communication device 202 switches from its shared channel mode to its dedicated channel mode. After step 818, step 820 is performed where the stimulator packet is optionally sent from the calling communication device 202 to the access point 206 via the cellular network 204 on a dedicated channel. In this scenario, the access point 206 discards or processes the packet as shown by step 822.

Although steps 816 and 818 are shown in FIG. 8 to occur in series, embodiments of the present invention are not limited in this regard. For example, steps 816 and 818 may occur in parallel rather than series. Notably, the communication device 202 will not transmit voice packets while it is transitioning from its shared channel mode to its dedicated channel mode.

At the same time or substantially the same time as steps 809, 812 and/or 815 are being performed, the communication device 214 performs channel mode switching operations to stimulate a channel mode switch as shown by steps 810, 814 and 817. The channel mode switching operations generally involve filling one or more buffers of the calling communication device 214 with a stimulator packet as shown by step 810. The stimulator packet includes data of an amount equal to or greater than a particular threshold value. The stimulator packet can be pre-stored in the memory 312 of the communication device 214 or dynamically generated by the communication device 214 in response to the reception of a PTT call setup message. The stimulator packet comprises stuff data and/or non-stuff data of an amount equal to or greater than a threshold value. The non-stuff data includes, but is not limited to, management data, control data, configuration data, contact list information, PTT subscriber information, communication device status information and/or GPS location information. In response to step 810, the called communication device 214 decides to request an upswitch of the network as shown in step 814. Thereafter, the called communication device 214 communicates the request to the cellular network 212 on a shared channel in an air interface as shown by step 817.

In response to the request, the equipment of the cellular network 212 (e.g., a base station) performs channel mode switching operations as shown by step 819. The channel mode switching operations generally involve exchanging communications with the called communication device 214. As a result of these communications, the equipment of the cellular network 212 (e.g., a base station) switches from its shared channel mode to its dedicated channel mode. Similarly, the called communication device 214 switches from its shared channel mode to its dedicated channel mode. After step 819, step 821 is performed where the stimulator packet is optionally sent from the called communication device 214 to the access point 210 via the cellular network 212 on a dedicated channel. In this scenario, the access point 210 discards or processes the packet as shown by step 823.

Subsequent to the channel mode switch, voice packets are sent from the calling communication device 202 to the access point 206 via cellular network 204 on a dedicated channel as shown by step 824. The access point 206 forwards the voice packets to the access point 210 via the host system infrastructure 208 as shown by step 825. In turn, the access point 210 forwards the voice packets to the called communication device 214 via the cellular network 212 on a dedicated channel as also shown by step 825. At the called communication device 214, the voice packets are processed and speech is output to a user via a user interface (e.g., a speaker) thereof as shown by step 826. Notably, the speech is output without gaps 144, 146 shown in FIG. 1, i.e., speech is not output from the receiving communication device 214 prior to the upswitches or communication mode switches that occur at steps 818 and 819. The elimination of gaps 144, 146 is achieved by: (a) stimulating substantially simultaneous (e.g., within milliseconds of each other) channel mode switches by the communication devices 202, 214; and (b) performing the channel mode switches prior to speech communications as shown by steps 818, 819, 824 and 825. Also as a result of simultaneously or substantially simultaneously performing steps 818 and 819, the latency is minimized when communication devices transition between channel modes.

Although the method embodiments of the present invention were described above in relation to individual PTT applications in an entirely WCDMA based communication system, the present invention is not limited in this regard. The method embodiments of the present invention can also be employed in group PTT applications. In these scenarios, the method embodiments of FIGS. 5-8 can be amended accordingly. For example, the stimulation packets can be sent to or from a plurality of called communication devices, rather than a single called communication device 214 as shown in FIGS. 5-8.

The method embodiments of the present invention can further be employed in PTT applications in which at least one of the cellular networks 204, 212 is not a WCDMA based cellular network. In these scenarios, the method embodiments of FIGS. 5-8 can be amended accordingly. For example, the simulation packets are only sent to or from communication devices 202, 214 that are communicatively coupled to an access point via a WCDMA based cellular network. The simulation packets are not sent to or from communication devices 202, 214 that are communicatively coupled to an access point via a non-WCDMA based cellular network. The non-WCDMA based cellular network can include, but is not limited to, an LTE based network and an LTE Advanced.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for providing data communications over a cellular network, comprising:

communicating a call setup message from a first communication device to a second communication device on a first communications channel in said cellular network at a first data transfer rate;

in response to said call setup message, communicating a stimulator packet to said first cellular network on said first communications channel at said first data transfer rate, said stimulator packet including data of an amount that equals or exceeds a threshold value;

in response to said stimulator packet, transitioning from a first channel mode to a second channel mode at said cellular network and said first or second communication device, said first channel mode different than said second channel mode in which data is transmitted on a second communications channel in said cellular network at a second data transfer rate different than said first data transfer rate; and communicating data packets from said first communication device to said second communication device on said second communications channel at said second data transfer rate.

2. The method according to claim 1, further comprising exchanging communications between said cellular network and said first or second communication device for transitioning channel modes, said communications exchanged in response to receiving said stimulator packet at said cellular network.

3. The method according to claim 1, further comprising receiving and discarding said stimulator packet at said first or second communication device.

4. The method according to claim 1, wherein said cellular network is a wideband code division multiple access based network.

5. The method according to claim 1, wherein said data of said stimulator packet comprises at least one of stuff data, management data, control data, configuration data, contact list data, GPS data and device status data.

6. The method according to claim 1, wherein said first or second communication device is an internet protocol based server.

7. A method for providing data communications over a cellular network, comprising:
communicating a call setup message from a first communication device to a second communication device on a first communications channel in said cellular network at a first data transfer rate;
filling at least one buffer of said first or second communication device with a stimulator packet, said stimulator packet including data of an amount that equals or exceeds a threshold value;
requesting a switch of channel modes of said cellular network;
in response to said request, transitioning from a first channel mode to a second channel mode at said cellular network and said first or second communication device, said first channel mode different than said second channel mode in which data is transmitted on a second communications channel in said cellular network at a second data transfer rate different than said first data transfer rate; and
communicating data packets from said first communication device to said second communication device on said second communications channel at said second data transfer rate.

8. The method according to claim 7, further comprising exchanging communications between said cellular network and said first or second communication device for transitioning channel modes, said communications exchanged in response to receiving said request at said cellular network.

9. The method according to claim 7, further comprising receiving and discarding said stimulator packet at said first or second communication device.

10. The method according to claim 7, wherein said cellular network is a wideband code division multiple access based network.

11. The method according to claim 7, wherein said first or second communication device is an internet protocol based server.

12. A first communication device, comprising:
at least one processing device configured to
(a) receive a call setup message sent from a second communication device on a first communication channel in a cellular network at a first data transfer rate,
(b) in response to receiving said call setup message, communicate a stimulator packet to said cellular network, said stimulator packet including data of an amount that equals or exceeds a threshold value for causing a transition between a first channel mode and a second channel mode at said cellular network and said second communication device, and
(c) receive data packets sent from said second communication device on a second communication channel in said first cellular network at a second data rate different than said first data rate.

13. The first communication device according to claim 12, wherein said first communication device is a network access point.

14. The first communication device according to claim 12, wherein said cellular network is a wideband code division multiple access based network.

15. The first communication device according to claim 12, wherein said data of said stimulator packet comprises at least one of stuff data, management data, control data, configuration data, contact list data, GPS data and device status data.

16. A first communication device, comprising:
at least one processing device configured to
(a) communicate a call setup message to a second communication device on a first communication channel in a cellular network at a first data transfer rate,
(b) in response to said call setup message, communicate a stimulator packet to said cellular network, said stimulator packet including data of an amount that equals or exceeds a threshold value for causing a transition between a first channel mode and a second channel mode at said cellular network and said second communication device, and
(c) communicate data packets to said second communication device on a second communication channel in said first cellular network at a second data rate different than said first data rate.

17. The first communication device according to claim 16, wherein said first communication device is a network access point.

18. The first communication device according to claim 16, wherein said first cellular network is a wideband code division multiple access based network.

19. The first communication device according to claim 16, wherein said data of said stimulator packet comprises at least one of stuff data, management data, control data, configuration data, contact list data, GPS data and device status data.

20. A communication device, comprising:
at least one processing device configured to
(a) fill at least one buffer with a stimulator packet in response to a call setup message, said stimulator packet including data of an amount that equals or exceeds a threshold value for causing a transition between a first channel mode and a second channel mode at a cellular network and said communication device,
(b) communicating a request for a switch of channel modes to said cellular network, and
(c) transitioning from said first channel mode to said second channel mode, said first channel mode different than said second channel mode in which data is transmitted on a second communications channel in said cellular network at a second data transfer rate different than said first data transfer rate.

21. The communication device according to claim 20, wherein said communication device is a mobile phone.

22. The communication device according to claim 20, wherein said cellular network is a wideband code division multiple access based network.

23. The communication device according to claim 20, wherein said data of said stimulator packet comprises at least one of stuff data, management data, control data, configuration data, contact list data, GPS data and device status data.

* * * * *